H. Barsalow.
Wheel Cultivator.
Nº 61,040. Patented Jan. 8, 1867.
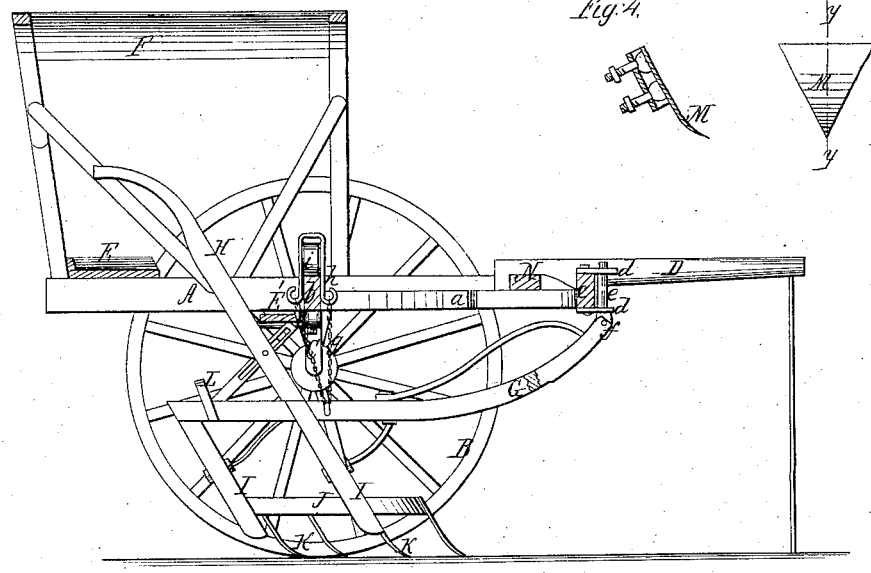
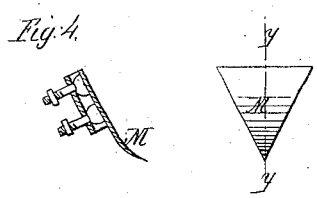
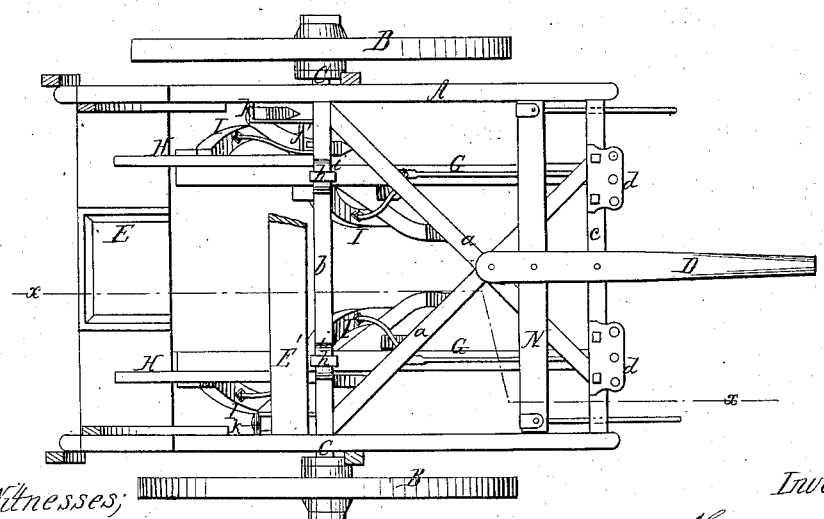
Witnesses:
J. A. Servin
Theo Tusch
Inventor:
Henry Barsalow
Per Munn & Co
Attorneys

United States Patent Office.

HENRY BARSALOW, OF SAINT ANNE, ILLINOIS.

Letters Patent No. 61,040, dated January 8, 1867.

IMPROVEMENT IN CULTIVATORS.

*The Schedule referred to in these Letters Patent and making part of the same.*

TO ALL WHOM IT MAY CONCERN:

Be it known that I, HENRY BARSALOW, of Saint Anne, in the county of Kankakee, and State of Illinois, have invented a new and improved Cultivator; and I do hereby declare that the following is a full, clear, and exact description thereof, which will enable those skilled in the art to make and use the same, reference being had to the accompanying drawings, forming part of this specification, in which—

Figure 1 is a side sectional view of my invention, taken in the line $x\ x$, fig. 2.

Figure 2, a plan or top view of the same.

Figure 3, a detached view of a tooth or share pertaining to the same.

Figure 4, a side sectional view of the same, taken in the line $y\ y$, fig. 3.

Similar letters of reference indicate corresponding parts.

This invention relates to a new and improved device for cultivating corn, cotton, and other plants grown in hills or drills, and it consists of a novel construction and arrangement of parts, hereinafter fully shown and described, whereby the device is placed under the complete control of the operator, and the parts rendered capable of being manipulated with the greatest facility.

A represents a rectangular frame, which is mounted on two wheels, B B, the axles C of which are of crank form in order to admit of the frame being sufficiently elevated, with wheels B of requisite diameter. This frame, A, is braced by diagonal rods, $a$, and a draught-pole, D, is attached to its front end. The frame A has a transverse bar, $b$, fitted in it in line with its axles C, and on the rear part of said frame the driver's seat E placed and attached in such a manner that it may be adjusted further forward or backward as desired. The rear part of the frame A is provided with a top, F, to protect the driver from the sun. To the front cross-bar $c$ of the frame A there are attached perforated metal plates, $d$, in which vertical arbors, $e$, are fitted, the lower ends of the latter having the front ends of beams G attached by hinges or joints, $f$, which admit of said beams working in a vertical direction. The arbors $e$ are allowed to turn freely in the plates $d\ d$, and hence it will be seen that the beams G have a universal-joint connection to the front part of the frame A. The beams G have each a handle, H, attached to them, and also two standards, I I, one in advance of the other, the lower ends of the standards being connected by a horizontal bar, J, to which cultivator teeth K are attached. The beams G G are retained at a proper height by means of chains $g$, attached to frames $h$, in which rollers $i$ are fitted, said rollers working on the cross-bar $b$ of the frame A, and admitting of the beams G and teeth K being moved laterally, as occasion may require, and the shares made to penetrate the earth at a greater or less depth by taking up or letting out the chains $g$. On the rear parts of the beams G stirrups L are secured, to receive the feet of the driver, in order to move the beams laterally, and also to serve as handles when the driver prefers walking, the seat E being removed in the latter case. The beams G are provided with lateral pins $j$, to fit upon brackets $k$ when the beams are to be held up, so that the teeth or shares will be free from the ground when the device is being drawn from place to place. When large teeth or shares M are required, as shown in figs. 3 and 4, the bars J are detached from the standards I I, and the teeth or shoes M secured directly thereto. N is a double-tree at the rear of the draught-pole D. A foot-piece, E', is placed on the brackets $k$, to be used when the driver adjusts the beams G by the handle H alone.

Having thus described my invention, what I claim as new, and desire to secure by Letters Patent, is—

1. The beams G, attached to the front of the frame A by an adjustable universal-joint connection, and suspended by chains near their rear ends to travelling-rollers $i$, on the raised cross-bar $b$ of frame A, substantially as and for the purpose set forth.

2. The combination of the mounted frame A, plough or share-beams G G, and detachable seat E, stirrups, and foot-piece E', all arranged substantially as and for the purpose specified.

HENRY BARSALOW.

Witnesses:
ACHILLES CHINIQUY,
ALBERT CHINIQUY.